March 8, 1960 D. A. SMITH ET AL 2,927,465
CONTINUOUS PROPORTIONAL PIPELINE SAMPLER
Filed Jan. 7, 1957 2 Sheets-Sheet 2
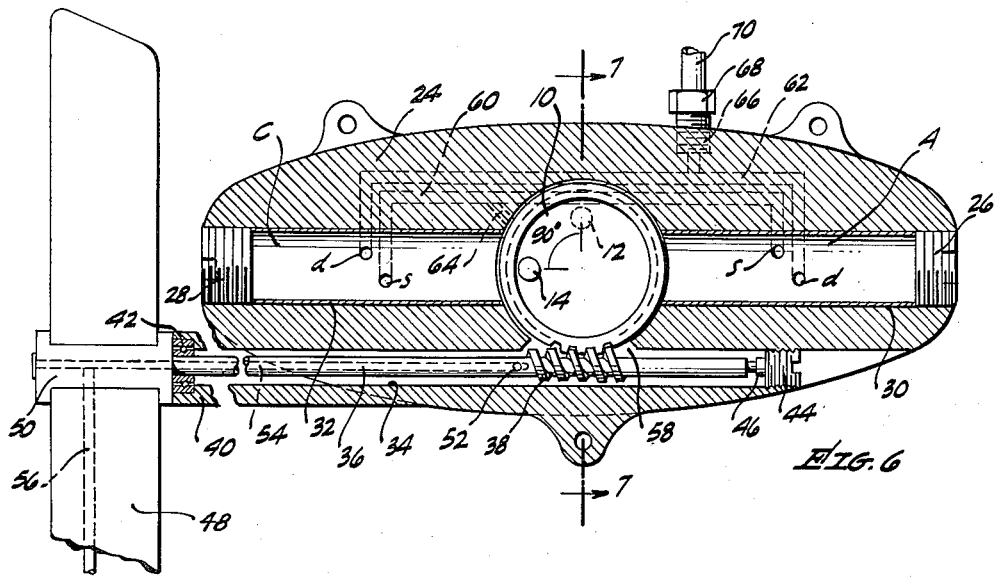
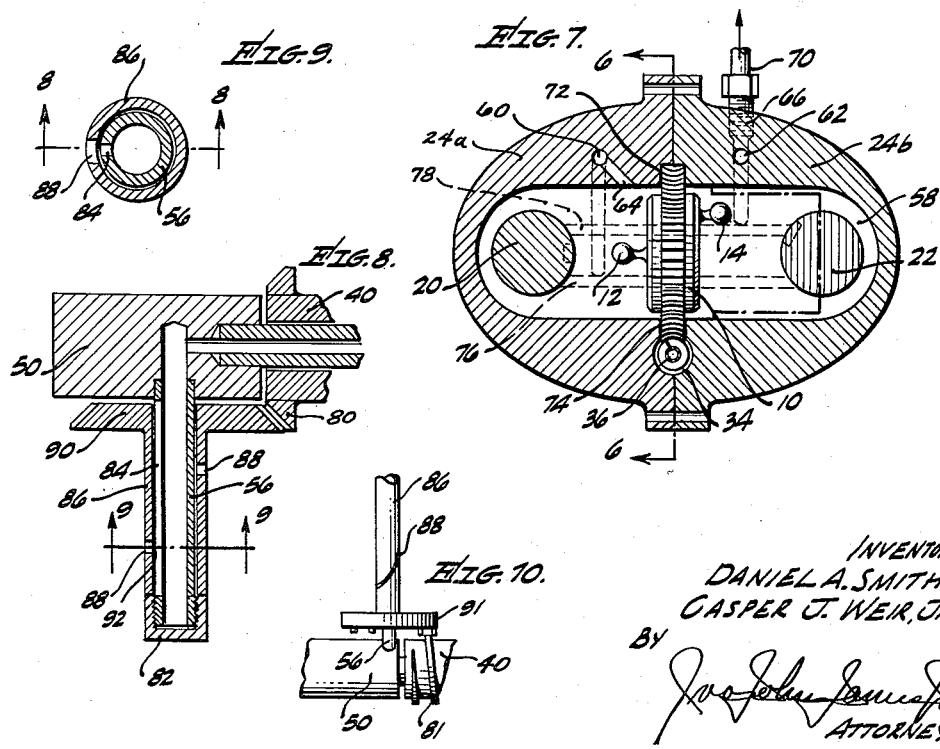
INVENTORS.
DANIEL A. SMITH,
CASPER J. WEIR, JR.,
BY
ATTORNEY.

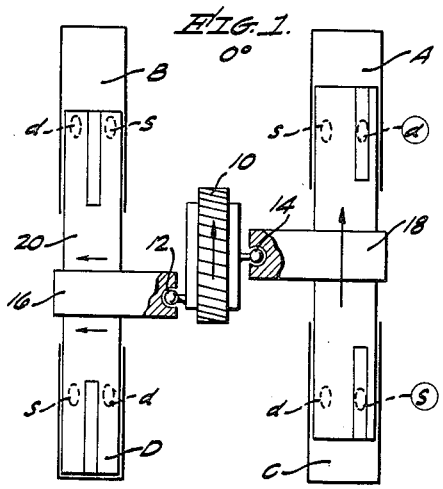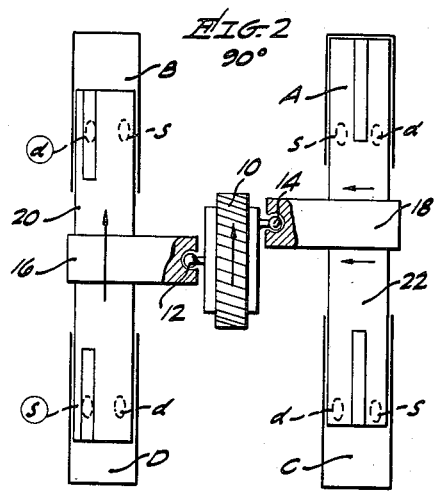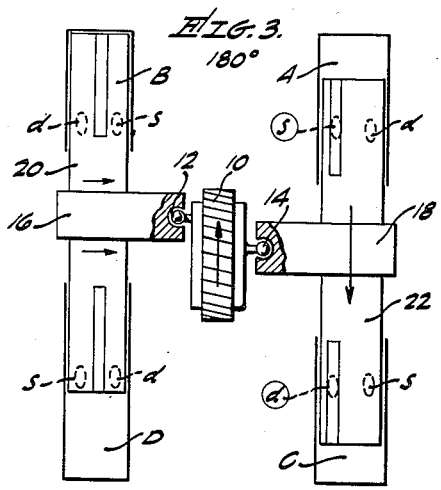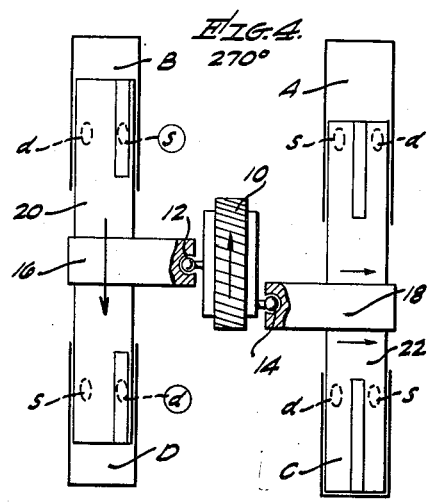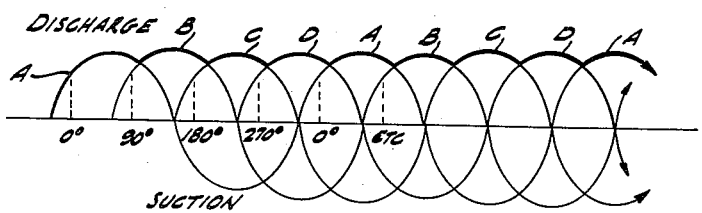

United States Patent Office 2,927,465
Patented Mar. 8, 1960

2,927,465

CONTINUOUS PROPORTIONAL PIPELINE SAMPLER

Daniel A. Smith, Brea, and Casper J. Weir, Jr., San Luis Obispo, Calif., assignors to Union Oil Company of California, Los Angeles, Calif., a corporation of California Application January 7, 1957, Serial No. 632,725

11 Claims. (Cl. 73—422)

This invention relates to the continuous sampling of fluids and particularly to the continuous proportional sampling of liquids such as crude oil and the like flowing through pipelines in order to obtain a small sample which is representative of the fluid transported through the line over any given time interval.

In many applications of fluid flow and particularly in the collection and transportation of crude petroleum it is necessary to obtain accurate representative samples of the fluid for analysis. In crude petroleum transportation systems for example, the crude produced from many individual wells is collected and pumped to suitable storage preparatory to refining the material into finished fuels, solvents, etc. In general, payment for the crude petroleum is made to many individual well owners and the price is a function of the quality of the oil, particularly its gravity. An accurate inspection is therefore required to determine the quality. Even in the situation where the oil is produced from a single owner, the quality may depend upon the proportion of oil in the line which is taken from various individual wells. Again an accurate inspection is required to determine the overall quality of the oil during any given time interval during which the material is pumped through the line. Such accurate inspection requires in the first instance a sample taken continuously at a rate which is proportional to the rate of flow in the line in which sampling is continued over a known period.

Sampling devices which have attempted to provide such samples are well known in the art. At the present time every commercially available type of sampler suffers from one or more serious disadvantages. One type takes a sample flow from the line through an orifice into a receiver. Although this is continuous it is not truly proportional to the quantity of flow because the sample stream will continue even if flow in the line stops. The sample rate is not increased in direct proportion to the flow rate in the line.

To avoid this particular problem several other samplers propose to use propeller driven mechanisms in which the propeller is turned by flow of the fluid being sampled. The propeller is usually provided with a gear reduction unit and the resultant low speed spindle rotation is used to activate intermittently a valve in the sample line. Although this type collects a sample at a rate which is proportional to the flow in the line, it is not truly continuous and the problems encountered include failure of the valve to close due to dirt or other solid materials which may lodge in it. Furthermore, the low speed spindle extends through the wall of the pipeline and the sampling valve is located external to the line. This immediately presents a shaft sealing problem and provides a load on the shaft caused by the packing. This leads to inaccuracy in that there is a substantial degree of slippage between the oil and the propeller caused by the extra load.

Other sampling devices use the spindle rotation to drive small sample pumps which take suction from the line and deliver a sample into a receiver. In these devices the spindle seal problem is encountered again. Furthermore, reciprocating pumps or plunger pumps which are used in these devices deliver an intermittent flow of oil rather than a continuous stream.

In each of these valve and pump samplers, briefly referred to above, the valves and the pumps are located outside of the line where, in addition to the seal problems mentioned, they are readily damaged. Although these devices have partially solved the initial problem, they are completely unable to obtain a representative sample even though continuously taken at a rate proportional to the line flow because they all utilize a single sample point located at some particular place in the cross section of the line. In pipeline flow at low relative velocities the liquid flows in "viscous flow" and thus the water and heavier components gravitate to the bottom of the line and flow along in this region. There is therefore a concentration gradient set up in the line which the previously proposed samplers will not detect. Even when the line is flowing at higher velocities in turbulent flow and in which all of the fluid components are presumably well mixed together, there is a velocity gradient in which liquids near the center of the line are flowing at considerably greater velocities than those nearer the pipeline walls. A single sampling point past which the oil velocity is a given value provides a proportional sample only with respect to that point, not with respect to the entire line.

The present invention is releated to an improved pipeline sampler which is completely contained within the line or within a commercially available fitting whose nominal size is the same as the nominal size of the pipeline, a device which is free of the rotating spindle or shaft seal problems, which is actuated by the flow of fluid in the line, which is capable of delivering a representative sample instantaneously as a function of the absolute pipeline flow rate, and in which the sample flow is continuous instead of intermittent. The device is further capable of sampling the entire cross sectional area of the pipeline so that an absolutely representative sample of the liquid flowing may be obtained.

It is therefore a primary object of this invention to provide an improved continuous sampling device for the taking of representative samples from flowing fluids.

It is a specific object of this invention to provide an improved apparatus for the continuous proportional sampling of fluids flowing through pipelines.

It is a more specific object to provide a propeller-driven continuous and proportional sampling apparatus disposed within a pipeline and including two double-acting reciprocating positive displacement valveless pumps each timed mechanically at 90° out of phase with each other to deliver a continuous proportionate sample stream.

It is a further object to provide in an apparatus as defined in the previous objects an apparatus for the sampling of the entire cross sectional area of the line to avoid inaccuracy heretofore resulting from the lamination or stratification of fluids in the line or from velocity gradients in the line.

Other objects and advantages of the present invention will become apparent to those skilled in the art as the description and illustration thereof proceed.

Briefly the present invention comprises a continuous flow sampling device actuated by the flow of the fluid in the line to be sampled and which delivers a continuous sample stream of the pipeline fluid by means of a propeller-driven, valveless, plural cylinder, reciprocating pump. The pump is supported in the line, or preferably within a pipeline fitting such as a T. The sample outlet line extends through a blind flange on the T side outlet. The sampling apparatus consists essentially of a corrosion resistant housing or body element preferably stream-lined containing a central pinion gear which is driven by a worm gear attached to the propeller shaft. A propeller is provided essentially at the center of the pipeline so that the shaft and worm gear extend substantially along the pipeline axis. The central pinion gear is provided on opposite sides with a pair of drive lugs disposed approximately 90° apart from each other and which are attached by means of crossheads to the intermediate section of a pair of pistons which are disposed on either side of the pinion gear in cylinders drilled through the housing parallel to the longitudinal axis of the propeller shaft and of the pipeline. The rotation of the pinion gear induced by the propeller rotation through a worm gear causes the pistons to reciprocate and to turn simultaneously through a restricted arc.

The pump thus provided consists actually of four pumps, one at each end of the two reciprocating pistons. These four pumps are each of the valveless type having ports drilled through the cylinder wall and having a piston provided with a longitudinal slot in the side of the piston adjacent its outer end. The ports previously referred to are drilled through the cylinder wall and spaced apart by an angle equal to the piston turning angle. Thus as the piston travels toward the cylinder head in the discharge stroke, the liquid is discharged between the cylinder wall and the piston through the slot and through the discharge opening provided. At the top of the stroke the piston turns through the aforementioned arc thereby aligning the slot with the suction port and the reverse movement of the piston draws in through the registered port and slot a charge of liquid for subsequent discharge. The four individual pumps are connected in parallel, that is, all the suction ports are connected together and all the discharge ports are connected together. From this discharge manifold a sample line to an external receiver runs from the pump through the wall of the pipeline. The suction manifold opens into the internal portions of the housing in which are located the propeller shaft, the worm gear, the pinion gear, the drive lugs, and the piston crossheads. This central chamber communicates through a hollow propeller shaft to a sampling tube disposed radially or essentially radially from the propeller hub between the propeller blades. The sampling tube thus rotates with the propeller and sweeps the entire cross sectional area of the pipeline. Preferably the propeller has a diameter somewhat less, but approximately equal to the inside diameter of the line, and preferably the sampling tube extends from the hub almost to the inside wall of the line. Suitable counterbalancing of the propeller to compensate for the sampling tube is desirable.

The present invention as briefly discussed above will be more readily understood by reference to the accompanying drawings in which:

Figures 1 through 4 illustrating the device of the present invention are plan views in semischematic form illustrating the relative location of the suction and discharge ports and the piston slots as well as showing the relation between the driving mechanism and the four individual pumps, Figure 5 is a graphic composite representation of the discharge and suction of each individual pump showing the substantially continuous nature of the sample stream, Figure 6 is a side elevation view in cross section of the device of this invention shown illustrating the manifolding and drive systems for the individual pumps, Figure 7 is an end elevation view in cross section of the device shown in Figure 6, Figure 8 is a detailed cross section view of one modification of the sampling tube by means of which a continuous representative sample is taken throughout the entire pipeline cross section, Figure 9 is a detailed cross section view of the apparatus shown in Figure 8, and Figure 10 is a modification of the device shown in Figures 8 and 9.

Referring now more particularly to Figures 1 through 4, the four piston pumps are shown in their positions at stages 90° apart. For purposes of clear description the individual cylinders are designated A, B, C, and D and the individual suction and discharge ports are indicated by $s$ and $d$. In these figures the active suction and discharge ports at any time are indicated respectively by $s$ and $d$ circled on the drawings. In each of the figures, arrows indicate the direction of travel of the piston in the suction and discharge part of the cycle or the direction of rotation of the piston during the period when the piston is changing between alignment with the suction and discharge ports. Pinion gear 10 is provided in a plane centrally located between the aligned cylinders. The pinion is turned slowly by a worm gear located immediately adjacent it, but not shown for sake of clarity of illustration. On either side of pinion gear 10 are located drive lugs 12 and 14. These drive lugs engage respectively crossheads 16 and 18 which in turn drive respectively pistons 20 and 22. It should be noted that pistons 20 and 22 are doubled-ended and reciprocate 180° out of phase at each end in cylinders B and D, and A and C respectively. Because of this 180° phase difference between the motions of opposite ends of the same piston, timing pistons 20 and 22, 90° apart, provide in the four piston pump system a 90° phase difference between the action of each individual pump. The 180° phase difference is best illustrated perhaps in Figure 1 in which cylinder A is discharging while cylinder C is in the suction stroke. The 90° phase difference between the individual pistons is obtained by locating drive lugs 12 and 14 on opposite sides of the pinion drive gear 90° apart from one another. This is more clearly shown in Figure 6.

Referring now more particularly to Figure 1, the arbitrary 0° or starting point of the pumping sequence is shown in which cylinder A is discharging, cylinder B is changing from suction to discharge, cylinder C is in the suction stroke, and cylinder D is changing from discharge to suction. In this situation, piston 20 is turning to the left in the direction shown by the arrows as drive lug 12 rises toward the viewer. Simultaneously piston 22 is moving upwardly as drive lug 14 moves toward the top of the drawing as it is normally viewed.

In Figure 2, the entire mechanism is shown 90° later in time. Cylinder A has completed its discharge stroke and is changing from discharge to suction as drive lug 14 moves away from the viewer, cylinder B is in the discharge position with piston 20 moving toward the top of the drawing, cylinder C is changing from suction to discharge, and cylinder D is in the suction portion of the cycle.

In Figure 3 showing the mechanism 180° from the starting point of Figure 1, cylinder B has completed its discharge stroke and is changing from discharge to suction. Cylinder D is changing from suction to discharge as piston 20 turns in the direction indicated as drive lug 12 moves from the viewer as normally viewed. Cylinder A is in the suction portion of the cycle and cylinder C is discharging as piston 22 moves toward the bottom of the drawing due to a similar motion of drive lug 14.

In Figure 4 the mechanism is shown 270° from the starting point. Cylinder C has completed its discharge stroke and is changing from discharge to suction. Cylinder A has completed its suction stroke and is changing from suction to discharge as piston 22 moves toward the right in the direction shown due to the motion of drive lug 14 moving toward the viewer. Piston 20 is moving toward the bottom of the drawing with cylinder B in the suction portion of the stroke and cylinder D in the discharge portion of the stroke due to a motion in the same direction of drive lug 12.

Continued operation for an additional 90° brings the mechanism back into the position shown in Figure 1 completing one cycle.

Referring now to Figure 5, a schematic representation of individual discharge and suction strokes of the various cylinders A, B, C, and D are shown in relation to one another. At 0° represented by Figure 1, cylinder A is in the midpoint of its discharge stroke while cylinder C is in the midpoint of its suction stroke. Cylinders B and D are at the ends of the previous suction and discharge strokes and are changing ports to reverse the flow. Because of the manifolding of all discharge ports and all suction ports into discharge and suction manifolds respectively and because of the 90° phase difference between the individual cylinders in the set of four, the discharge of the apparatus as a whole is shown by the upper darkened line in Figure 5. The discharge period of the individual cylinders is designated by A, B, C, etc. The suction flow is likewise continuous and is shown by the corresponding curve at the bottom of Figure 5.

With respect to Figures 1 through 4 it should be noted that the drawings are semischematic. The driving mechanism and the housing or body element enclosing the cylinders and supporting the pistons and the drive pinion 10 have been omitted. Furthermore, the location of the suction and discharge ports s and d have been rotated about 90° from their actual positions in which they are most readily manifolded in the course of construction of the device, that is, a position facing each other. In other words, in Figures 1 through 4, the suction and discharge ports are indicated as being at the top of the device whereas actually they are turned 90° to the right and downwardly in the left-hand set of cylinders and 90° to the left and downward in the right-hand set of cylinders A and C so that corresponding suction and discharge ports of cylinders A and B and the corresponding ports of cylinders C and D face each other and are readily manifolded by openings drilled directly through the body or housing between these cylinders. Further details in the manifolding of the corresponding suction and discharge ports is more clearly shown in the subsequent figures.

Referring now more particularly to Figure 6, a side elevation view in cross section of the complete sampling device according to this invention is shown taken along the section shown in Figure 7, but in which piston 22 has been removed from the cylinder in order to show the location and angular displacement between the suction and discharge ports in cylinders A and C respectively. Drive lugs 12 and 14 are shown spaced 90° apart from one another on opposite sides of drive pinion 10. Body element 24 is here shown in its preferred form of a stream-lined ellipsoidal shape. The housing is fabricated preferably in the form of a split casting, more clearly shown in Figure 7, and then machined into the form shown. Cylinders A and C and cylinders B and D are formed by boring an opening through their respective halves of the split casting. In Figure 6 this opening is closed at both ends by means of plugs 26 and 28 and provided with cylindrical liners 30 and 32. The liners are desirable since they are readily replaced as they wear during use of the apparatus. A third longitudinal opening 34 is bored through the lower part of body element 24 to provide space for propeller shaft 36 and drive worm 38 which engages with pinion 10. A projection 40 at the upstream end of body element 24 is provided through which the propeller shaft passes and in which are located alignment bearings 42. At the opposite end of this lower or propeller shaft channel is located a plug 44 and thrust bearing 46.

At the upstream end of propeller shaft 36 is located a propeller 48 having four or eight blades extending radially from propeller hub 50. Propeller shaft 36 is hollow and is provided adjacent worm 38 with opening 52. A conduit 54 is thus provided in the hollow propeller shaft which communicates the central chamber 58 with a sampling tube 56 supported radially between the propeller shaft blades from hub 50. Sampling tube 56 is open and provides the inlet for the sample taken from the line. Because it rotates with the propeller shaft the opening may be made to sweep the entire cross sectional area of the line in the manner appropriate to the nature of the flow so that a completely representative sample can be taken.

The flow communication through the apparatus is such that the sample flows through sample tube 56, through hollow propeller shaft 54 and opening 52 into the central chamber 58 which is bored in each half of the split casting and having an axis transverse to the direction of flow. This chamber is more clearly shown in Figure 7. Within the chamber is contained drive worm 38, drive pinion 10, and the crossheads not shown in Figures 6 and 7 but indicated more clearly in Figures 1 through 4. This chamber is filled with liquid to be sampled flowing toward the suction ports of the individual pumps. It lubricates the moving mechanical parts driving the pumps as well as the pistons themselves. As previously described, the suction and discharge ports are manifolded between cylinders at each end of housing 10 by drilling holes through the casting between the adjacent cylinders as shown in Figure 7. These holes form the suction and discharge ports s and d where they intersect cylinders B and D not shown, and cylinders A and C, shown in Figure 6. In order to manifold the suction and discharge ports of the cylinders at each end of the device, suction and discharge manifolds 60 and 62 respectively are drilled through housing or element 24 to connect the openings running transverse through the body element between the suction and discharge ports respectively of the cylinders located at the same end of body element 60. The suction manifold communicates through opening 64 with the central or suction chamber 58, previously described, and in this way all suction ports are connected together and supplied with fluid to be sampled from central chamber 58.

A discharge opening 66 is drilled through the top of housing 24 and provided with fitting 68 attaching sample and discharge line 70 which runs to a suitable receiver. In this way all of the discharge ports d are manifolded together and communicates with the sample receiver.

Referring now more particularly to Figure 7, drive pinion 10 and drive worm 12 are shown disposed between suitable milled depressions 72 and 74 around the central chamber 58. Drive lugs 12 and 14 are shown which are connected to pistons 20 and 22 by means of crossheads, not shown, but indicated in Figures 1 through 4. The hollow propeller shaft 36 is indicated running through lower opening 34. The two halves 24a and 24b constituting the split casting forming body element 24 are also more clearly shown.

The transverse primary manifolds previously described connecting the discharge and suction ports d and s respectively in the cylinders disposed at the same end of body element 24 are more clearly shown in Figure 7. These primary manifolds 76 and 78 are shown in Figure 7 drilled through the body element in a direction transverse to the axis of the propeller shaft and displaced from one another so that they intersect the cylinder walls in suction and discharge ports displaced from one another by an angle equal to the angle through which the pistons turn. This angle is ultimately determined by the distance which drive lugs 12 and 14 are located radially from the center of drive pinion 10 and the distance between the center lines of pistons 20 and 22. These transverse or primary manifolds 76 and 78 are provided with O ring seals, or other suitable seals not shown, at the points where they intersect the mating surfaces of the split casting.

Secondary manifolds 60 and 62, shown extending longitudinally through each half of body element 24 in Figure 6, are also shown in Figure 7. These manifolds are of an inverted U shape and communicate at their ends with the transverse or primary manifolds 76 and 78 respectively. Suction opening 64 communicating the secondary suction manifold 60 with central chamber 58 is also shown.

The fabrication of the primary suction and discharge manifolds 76 and 78 has been previously discussed. The secondary suction and discharge manifolds 60 and 62 are formed by drilling longitudinal channels completely through the body element and plugging the ends with suitable cap screws or plugs. These secondary suction and discharge manifolds are then communicated with the primary manifold by drilling additional channels which intersect both the longitudinal secondary manifolds with the transverse primary manifolds. These openings are also plugged at the end which intersects the outer surface of the body element. This is customary machine shop practice and is well known in that particular art.

Referring now more particularly to Figure 8, a detailed cross section view of propeller hub 50 and the associated sampling tube 56 is shown. The purpose of this particular structure is to provide a movable inlet opening through which the sample is taken from the line at a point which sweeps the cross sectional area of the pipeline. In this modification, a stationary bevel gear 80 is disposed at the end and at the outer surface of projection 40 described previously in connection with Figure 6. Stationary sampling tube 56 extends radially from hub 50 and is provided at its outer end with cap 82. Disposed longitudinally along the upstream extremity of sample tube 56 is a slot 84. Surrounding sample tube 56 is rotatable sampling tube 86 which is provided with a spiral shaped opening 88 and with bevel gear 90. The curving slot 88 extends around tube 86 by an amount less than 360° to provide only a single intersection with the longitudinal slot of inner sampling tube 56. Drive gear engages gear 80 and as propeller hub 50 turns, the outer tube 86 rotates with respect to the stationary sampling tube 56. Because of the longitudinal nature of stationary slot 84 of the curved nature of moving slot 88, the opening at the intersection between the two slots at point 92 moves radially along sampling tube 56 as the propeller turns. The fluid sample taken into the apparatus at this intersection point is taken from successively different parts of the pipeline cross section. Preferably sampling tube 56 is extended to within reasonable mechanical clearances of the inner wall of the pipeline and therefore fluids flowing along the bottom of the line as well as those flowing in the center of the line are sampled in proportion to the extent of their presence and flow rate in the line.

In Figure 9, a cross section view of Figure 8 is shown taken in the direction indicated. Inner or stationary sampling tube 56 provided with longitudinal slot 84 is shown surrounded by outer or rotating sampling tube 86 having a curved slot 88.

In Figure 10, a modification of the driving gear system for the moving sampling tube 86 is shown. The curved nature of slot 88 is apparent in Figure 10. A modified driving gear 91 is shown connected at the lower or innermost end of rotating sampling tube 86. Stationary sampling tube 56 is shown offset on propeller hub 50 but still in a near radial position. A stationary worm 81 is disposed at the end projection 40 and engages the rotating gear 91. The rotating sampling tube 86 is turned one "nth" of a revolution per revolution of the propeller hub 50 wherein n is the number of teeth or projections on drive gear 91. Obviously the modification permits relatively low rotational speeds in the rotating sampling tube 86 whereas the modification shown in Figure 8 is amenable to higher rotary speeds of the rotating sampling tube.

The nature of the curvature of curving slot 88 in rotating sampling tube 86 depends upon the nature of flow in the line and the amount of sample desired at a given radial position. As is well known, the velocity gradient in the line along a given diameter in viscous or streamline fluid flow is not the same as the velocity gradient across the same diameter when the fluid is in turbulent flow. Accordingly the volumetric rate of fluid flowing through a differential annular area located near the pipeline wall tends to be considerably less than the volumetric rate of fluid flowing through an equal differential annular area at a point located nearer to the pipeline's longitudinal axis because of velocity differences. Also in circular pipelines the volumetric rate of fluid flow through successive annular areas of equal differential radius tends to increase as annuli of successively larger radius are selected because of the area increase. Combining this latter mathematical relationship with the velocity gradient which is experimentally determined, the variation in fluid flow rate as a function of radial position in the line may be determined. In order to obtain a perfectly representative sample, the sampling point at the intersection of the curved and longitudinal slots of the rotating and stationary sampling tubes 86 and 56 respectively, describes a spiral in the line and moves radially through the cross section of the line at a rate which changes with increasing radial distance of the sampling point from the line axis. In this way, with an overall constant flow rate in the line, an absolutely representative fluid sample is taken by the device of the present invention throughout the cross sectional area of the line. Thus the problems of velocity gradients and of fluid stratification in the line are overcome. Because the device is propeller-driven and samples the transported fluid at a rate proportional to the fluid flow in the line, the representative sample is further representative over a period of time of the fluid passing the sampling device in a given time interval.

Several devices according to the principles of the present invention have been constructed and extensively tested in the continuous sampling of crude oil transported through pipelines from oil fields to refining installations in Southern California. One model corresponding substantially to the drawings herein was installed in a pipeline and was adjusted to sample at the rate of 0.8 ml. per barrel of oil passing the sampling device. Flow rate varied during the test between limits of about 9600 and 28,800 barrels of crude oil per day. The gravity of the oil as determined by samples taken of oil entering the line varied between 29.1 and 32.3° API. The flow rates as well as the gravities continuously fluctuated during the test. The following table indicates comparative data taken during the test comparing the API gravity and % S.W. & S. (suspended water and solids) obtained on samples taken with the present sampling device as well as with a commercially available sampling device located adjacent the device of the present invention in the pipeline with the inspection of the oil introduced into the line.

*Table*

| Average Into Line | | Smith-Weir Sampler | | Commercial Sampler | |
| --- | --- | --- | --- | --- | --- |
| Gravity, °API | Percent S.W. & S. | Gravity, °API | Percent S.W. & S. | Gravity, °API | Percent S.W. & S. |
| 29.1 | [1] 0.8 | 29.1 | 0.2 | 30.0 | 0.2 |
| 31.1 | 0.4 | 31.1 | 0.4 | 27.4 | 0.4 |
| 29.5 | 0.7 | 29.5 | 0.6 | 23.9 | 0.6 |
| 32.3 | 0.4 | 32.4 | 0.4 | 26.6 | 0.3 |

[1] Raining during sampling line inlet.

It is readily apparent that whereas the previously used commercial sampler failed to give accurate results, particularly in relation to the oil gravities, the device of the present invention provided completely proportional and continuously taken samples of oil passing through the line and the gravity of the sample taken checks that of entering oil.

The device is self-lubricating and is actuated by the motion of fluid to be sampled. The device will not leak fluid when the fluid in the line is not moving although the fluid exists therein under pressure. Because the device is totally immersed in the fluid in the line, vapor locking in the case of liquid sampling is impossible. The sampler takes a continuous sample which is absolutely proportional to the flow rate in the line and which is unaffected by velocity and concentration gradients existing in the line. In one modification of this invention a variable pitch propeller is provided so as to control directly the size of the sample relative to the volume of fluid flowing in the line. The sampler utilizes no shaft packing and is located internally so that no damage to the device is likely. By reversing the drive pinion in the sampler or by other means, the sampler can be employed to inject fluids at very low rates into the fluid flowing in the line. This is highly desirable in treating fluids such as by adding tetraethyllead to gasoline, injecting inhibitors, additives, and other ingredients into gasoline, and the like.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

We claim:

1. An apparatus for taking a continuous proportional sample of fluids flowing through a pipeline which comprises a body element provided internally with a pair of parallel elongated cylindrical openings and a transverse central opening intersecting said cylindrical openings intermediate their ends, a piston having a longitudinal slot extending from each end thereof and reciprocable and rotatable through a restricted arc in each of said cylindrical openings, a crosshead attached to the intermediate portion of each of said pistons in said central opening, a pinion drive gear disposed within said central opening, a drive lug on each side of said pinion and disposed 90° apart from each other and each engaged with one of said crossheads, a hollow propeller shaft opening at one end into said central chamber, a worm gear at that end engaged with said pinion, a propeller at the other end of said shaft, a hollow sampling tube disposed substantially radially from said shaft, said sampling tube contacting the flowing fluid adjacent the propeller and communicating with the opening in said propeller shaft, said body element also having at each end thereof a primary suction and a primary discharge manifold extending transversely therethrough into intersection with said cylindrical openings forming suction and discharge ports separated from each other by the same arc and registerable with said longitudinal slot as said pistons rotate, said primary suction manifolds being connected together and with said central chamber, said primary discharge manifolds being connected together, and an outlet conduit communicating the discharge manifolds with a sample receiver.

2. An apparatus according to claim 1 wherein said body element is in the form of a stream lined elipsoidal geometric element consisting of two symmetrical halves divided along a plane passing between said cylindrical openings and through said central opening, in combination with means for securing said halves together.

3. An apparatus according to claim 1 wherein said primary suction manifolds are connected together through a U-shaped secondary manifold provided in said body element, said secondary manifold opening also into said central chamber, and wherein said primary discharge manifolds are connected together through a U-shaped secondary discharge manifold provided in said body element, said outlet conduit being connected directly to said secondary discharge manifold.

4. An apparatus according to claim 1 wherein said sampling tube is provided with a cap at its outer end and with a longitudinal slot extending substantially along its entire length, in combination with an outer rotatable sampling tube provided with a curving slot surrounding said sampling tube, and means for turning the outer rotatable sampling tube relative to the inner sampling tube during rotation of said propeller.

5. An apparatus according to claim 4 wherein said means for turning said outer rotatable sampling tube comprises a first bevel gear attached to said rotatable sampling tube adjacent its inner end, and a second stationary bevel gear in engagement with said first bevel gear and attached to said body element.

6. An apparatus according to claim 4 wherein said means for turning said outer rotatable sampling tube comprises a stationary worm gear attached to said body element, and a gear in engagement with said worm and attached to the innermost end of said outer rotatable sampling tube.

7. An apparatus according to claim 4 wherein the longitudinal slot in said inner sampling tube faces upstream in the flow of fluid past the propeller.

8. An apparatus according to claim 4 wherein the curvature of said curving slot in said outer rotatable sampling tube provides at the intersection thereof with said longitudinal slot in said sampling tube a sampling point which sweeps substantially the entire cross section of the fluid flow as the propeller rotates and whose radial distance from the axis of propeller rotation changes at a rate which changes with increasing radial distance from said axis.

9. An apparatus according to claim 4 wherein said curving slot extends around said outer rotating sampling tube by an amount less than 360° to provide only a single intersection with said longitudinal slot.

10. An apparatus for taking a continuous proportional sample of fluids flowing through a pipeline and for injecting other fluids into said fluids flowing through said pipeline, which comprises a body element provided internally with at least one elongated cylindrical opening and a transverse central opening, a piston having a longitudinal slot extending from each end thereof and reciprocable and rotatable through a restricted arc in said cylindrical opening, drive means attached to the intermediate portion of said piston in said central opening for alternately driving said piston longitudinally and rotating it through said arc, a propeller in said pipeline adapted to rotate in response to the flow of the fluids therein, said propeller being adapted to actuate said drive means, sampling means contacting the fluids flowing in said pipeline, and sample receiver means, said body element having at each end thereof a suction port and a discharge port extending therethrough into intersection with said cylindrical opening, said ports being separated from each other by said arc and alternately registerable with said longitudinal slot as said piston is rotated, said suction ports communicating with each other and with said sampling means, and said discharge ports communicating with each other and with said sample receiver means.

11. An apparatus according to claim 10 in which said sampling means comprises an inner sampling tube and a surrounding coaxial outer sampling tube, each extending radially substantially from the center of said pipeline to the inner wall thereof, and each tube having a slot extending substantially the entire length thereof, means for rotating one of said sampling tubes axially with respect to the other in response to the rotation of said propeller, and means for rotating both tubes from their central ends in a plane transverse to the pipeline axis in response to the rotation of said propeller, one of said slots being curved with respect to the other so that the two slots intersect to form an opening of limited area, the location of said opening moving along the length of the sampling tubes as the one tube is rotated with respect to the other and also moving in transverse plane as both tubes are rotated therein, the slot in the outer sampling tube contacting the fluids flowing in said pipeline and the slot in the inner sampling tube communicating with said suction ports.

References Cited in the file of this patent

UNITED STATES PATENTS

| | | |
|---|---|---|
| 1,108,278 | Thomas | Aug. 25, 1914 |
| 2,020,529 | Thorsten | Nov. 12, 1935 |
| 2,116,265 | Hedjuk et al. | May 3, 1938 |
| 2,272,313 | Waters | Feb. 10, 1942 |
| 2,784,594 | Struck | Mar. 12, 1957 |